US009235376B2

(12) United States Patent
Kamikubo (10) Patent No.: US 9,235,376 B2
(45) Date of Patent: Jan. 12, 2016

(54) ELECTRONIC DEVICE, AND CONTROL METHOD AND STORAGE MEDIUM STORING CONTROL PROGRAM

(75) Inventor: Hiroshi Kamikubo, Kanagawa (JP)

(73) Assignee: KYOCERA CORPORATION, Kyoto (JP)

(*) Notice: Subject to any disclaimer, the term of this patent is extended or adjusted under 35 U.S.C. 154(b) by 71 days.

(21) Appl. No.: 13/492,022

(22) Filed: Jun. 8, 2012

(65) Prior Publication Data

US 2012/0315957 A1 Dec. 13, 2012

(30) Foreign Application Priority Data

Jun. 10, 2011 (JP) ................................. 2011-129961

(51) Int. Cl.
| H04M 1/04 | (2006.01) |
| G06F 3/16 | (2006.01) |
| H04M 1/725 | (2006.01) |
| G10L 15/26 | (2006.01) |
| H04L 12/58 | (2006.01) |

(52) U.S. Cl.
CPC ........... *G06F 3/167* (2013.01); *H04M 1/72519* (2013.01); *H04M 1/72547* (2013.01); *G10L 15/26* (2013.01); *H04L 51/22* (2013.01); *H04M 2250/62* (2013.01); *H04M 2250/74* (2013.01)

(58) Field of Classification Search
CPC . H04M 1/04; H04M 1/0214; H04M 1/72519; H04M 1/72547; H04M 1/72583; G06F 3/02; H06F 3/167
USPC ............ 455/412.1, 414.1–414.3, 418, 550.1, 455/563, 566, 567, 575.1, 411
See application file for complete search history.

(56) References Cited

U.S. PATENT DOCUMENTS

| 2004/0145654 | A1 | 7/2004 | Motohashi |
| 2006/0281495 | A1* | 12/2006 | Yang .............................. 455/563 |
| 2008/0003985 | A1* | 1/2008 | Jung et al. .................. 455/414.1 |
| 2008/0182555 | A1* | 7/2008 | Madanes et al. .............. 455/411 |
| 2011/0143739 | A1* | 6/2011 | Rippingale .................... 455/418 |
| 2011/0294552 | A1* | 12/2011 | Forstall et al. ................ 455/566 |

FOREIGN PATENT DOCUMENTS

| JP | 2002297645 A | 10/2002 |
| JP | 2004228805 A | 8/2004 |
| JP | 2007-200243 A | 8/2007 |
| JP | 2008004103 A | 1/2008 |
| JP | 2010003025 A | 1/2010 |
| JP | 2010267269 A | 11/2010 |

OTHER PUBLICATIONS

Notice of Reasons for Rejection issued to JP Application No. 2011-129961, Sep. 16, 2014.

* cited by examiner

*Primary Examiner* — Thanh Le
(74) *Attorney, Agent, or Firm* — Hauptman Ham, LLP (57) ABSTRACT

There is provided an electronic device that can execute a function using characters inputted during a telephone call, and a control method and a control program thereof. An application control unit inputs a character as an input character using an input control unit in a state where a call with a predetermined communication counterpart is continuing using a communication unit. When a predetermined function is selected after the input character is inputted with the input control unit, the application control unit executes a predetermined function in a state where the input character is inputted.

11 Claims, 8 Drawing Sheets

ELECTRONIC DEVICE, AND CONTROL METHOD AND STORAGE MEDIUM STORING CONTROL PROGRAM

This application is based on and claims the benefit of priority from Japanese Patent Application No. 2011-129961 filed on 10 Jun. 2011, the content of which is incorporated herein by reference.

BACKGROUND OF THE INVENTION

1. Field of the Invention

The present invention relates to an electronic device that inputs characters, and a control method and a storage medium storing therein a control program.

2. Related Art

Conventionally, when a so-called numeric key is operated in a state where a standby screen is displayed on a display unit, an electronic device such as a mobile phone inputs a character assigned to the numeric key thus operated and displays the character on the display unit. When the user selects a desired function in a state where the character is inputted, such an electronic device executes the selected function in a state where the character is inputted (for example, refer to JP2007-200243A).

SUMMARY OF THE INVENTION

However, the electronic device described in JP2007-200243A assumes that the function of an application or the like is executed using the character inputted in a state where a standby screen is displayed, and does not execute a function using the character inputted during a telephone call.

An object of the present invention is to provide an electronic device that can execute a function using a character inputted during a telephone call, and a control method and a storage medium storing therein a control program.

In order to solve the above problem, the electronic device according to the present invention includes: a communication unit; an input unit for inputting a character; and a control unit which, when a character is inputted as an input character by the input unit and a predetermined function is selected at a time when a call is being made with a predetermined communication counterpart by the communication unit, executes the predetermined function in a state where the input character is inputted.

In addition, the predetermined function may be a search function for searching predetermined data and the control unit may perform a search based on the input character by executing the search function in a state where the character is inputted, and sends a search result to the predetermined communication counterpart by the communication unit.

In addition, the control unit may control the communication unit such that the search result is converted into different formats and sent to the predetermined communication counterpart according to the kind of data searched by the search function.

In addition, the electronic device may further include an operation unit, and the input unit may input a character as an input character according to an operation performed with the operation unit.

In addition, the electronic device may further include a voice recognition conversion unit for converting contents of a talk carried out using the communication unit into characters by performing voice recognition, and the input unit may input the characters converted by the voice recognition conversion unit as an input character.

In addition, the electronic device may further include an extraction unit for extracting a word by performing a morphological analysis of the character converted by the voice recognition conversion unit, and the input unit may input, as an input character, the word extracted by the extraction unit, among the characters converted by the voice recognition conversion unit.

The electronic device may further include a display unit, and when the input character is inputted and the predetermined function is selected such that contents that are based on the selection of the predetermined function are displayed on the display unit at a time when a call is being made with a predetermined communication counterpart by the communication unit, the control unit may display the contents on the display unit included in an electronic device of the predetermined communication counterpart.

In addition, the predetermined function may be a function selected from a plurality of character inputting functions that can perform processing based on the input character, and the control unit may change a function included in the plurality of character inputting functions according to the communication counterpart that the communication unit communicates with.

In order to solve the above problem, the method for controlling an electronic device according to the present invention includes: a step of communicating; a step of inputting a character; a step of executing a function; and a step of executing, when a character is inputted as an input character as a result of the step of inputting and a predetermined function is selected at a time when a call is being made with a predetermined communication counterpart as a result of the step of communicating, the predetermined function by the step of executing in a state where the input character is inputted.

In order to solve the above problem, A non-transitory storage medium that stores a control program causing, executed by an electronic device, the electronic device to execute: communicating; inputting a character; executing a function; and executing, when a character is inputted as an input character as a result of the inputting and a predetermined function is selected at a time when a call is being made with a predetermined communication counterpart as a result of the communicating, the predetermined function by the executing in a state where the input character is inputted.

In accordance with the present invention, it is possible to provide an electronic device that can execute a function using a character inputted during a telephone call, and a control method and a storage medium storing therein a control program.

BRIEF DESCRIPTION OF THE DRAWINGS

FIG. 5A-5C is a third diagram showing the screen of the display unit at a time when a video phone function is executed;

FIG. 6A-6B is a fourth diagram showing the screen of the display unit at the time when a video phone function has been executed;

DETAILED DESCRIPTION OF THE INVENTION

Figure 1:
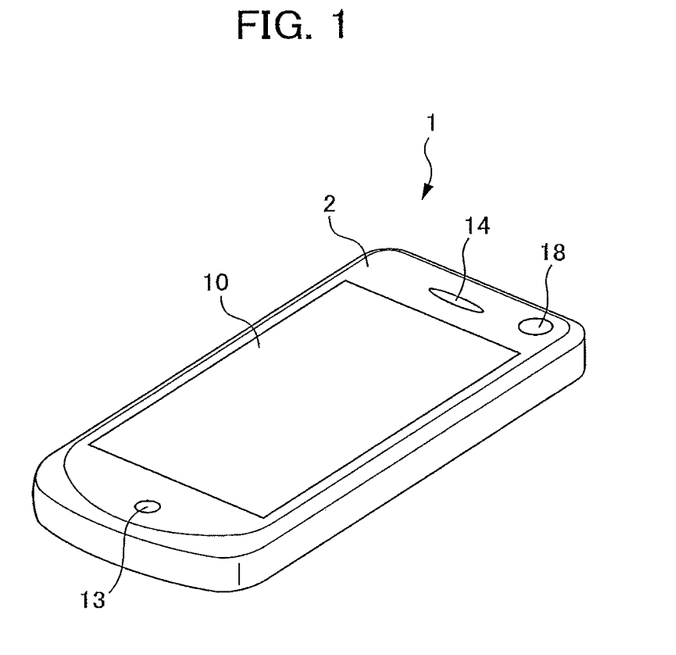
FIG. 1 is an external perspective view of a mobile telephone device according to the present embodiment.

Descriptions are provided hereinafter regarding an embodiment of the present invention. First of all, with reference to FIG. 1, descriptions are provided for a basic structure of a mobile telephone device 1 according to an embodiment of the portable electronic device of the present invention. FIG. 1 is a perspective view showing an appearance of the mobile telephone device 1 according to the present embodiment.

The mobile telephone device 1 includes a body 2. A touch panel 10, a microphone 13, a speaker 14 and a imaging unit 18 are disposed on a front face portion of the body 2.

Figure 2:
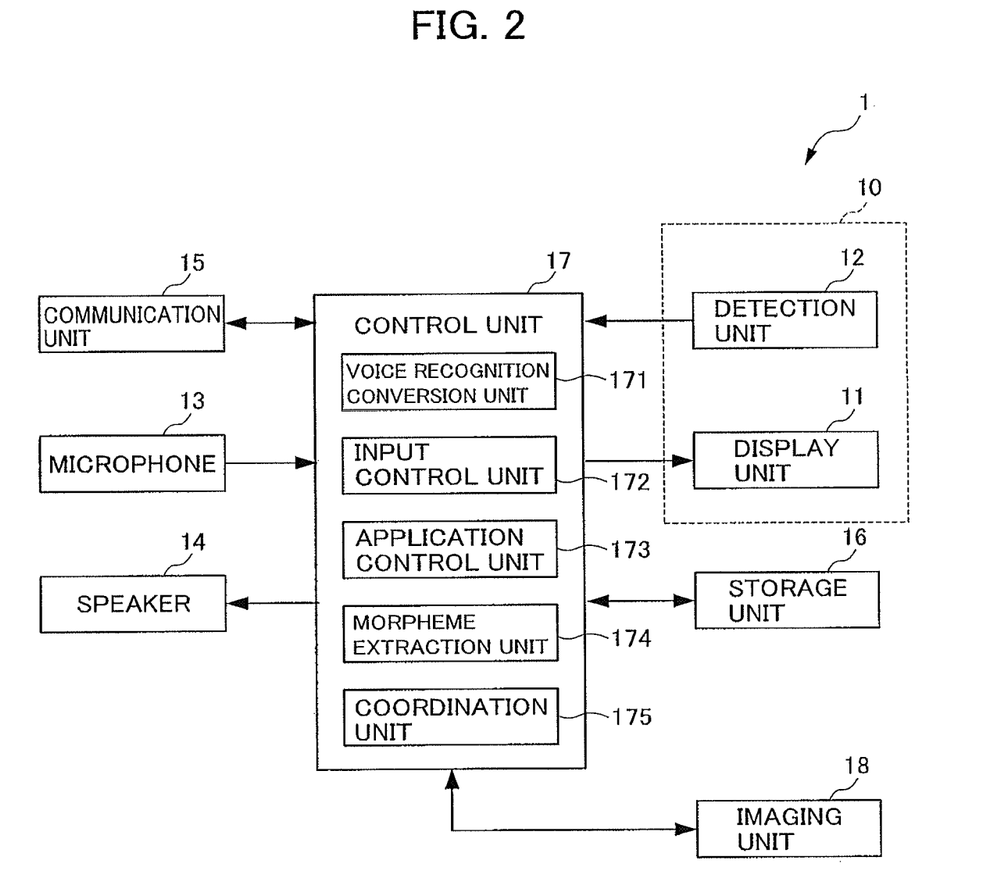
FIG. 2 is a functional block diagram showing the function of the mobile telephone device according to the embodiment.

The touch panel 10 includes a display unit 11 and a detecting unit 12 (see FIG. 2). The display unit 11 is a liquid-crystal display panel, an organic EL (electroluminescence) display panel, or the like. The detecting unit 12 is a sensor that detects a touch by an object, such as a finger or stylus of a user of the mobile telephone device 1, on the display unit 11. The detecting unit 12 is correspondingly disposed in the surface of display unit 11, and for example, a sensor that employs a capacitive sensing method or a resistive film method can be utilized as the detecting unit 12.

The microphone 13 is used for inputting sound produced by the user of the mobile telephone device 1 during a telephone call. The speaker 14 is used for outputting sound produced by the other party whom the user of the mobile telephone device 1 is talking with during a phone call. The imaging unit 18 is configured with a camera module, and is used for talking with during a phone call using a video phone function.

Next, a functional configuration of the mobile telephone device 1 is described with reference to FIG. 2. FIG. 2 is a block diagram showing a functional configuration of the mobile telephone device 1.

The mobile telephone device 1 includes the touch panel 10 (the display unit 11 and the detecting unit 12), the microphone 13, the speaker 14 and the imaging unit 18 as described above. In addition, the mobile telephone device 1 includes a communication unit 15, a storage unit 16, and a control unit 17.

The communication unit 15 includes a main antenna and an RF circuit unit, and makes an outgoing call to and performs communication with a predetermined contact entity. The contact entity, to which the communication unit 15 makes an outgoing call, is an emergency contact entity such as, for example, the police or fire station. Moreover, the contact entity, to which the communication unit 15 makes an outgoing call, is an external device that performs a telephone call or mail transmission/reception with the mobile telephone device 1, or an external device or the like such as an external web server, with which the mobile telephone device 1 establishes Internet connections.

The communication unit 15 performs communication with an external device via a predetermined usable frequency band. More specifically, the communication unit 15 executes demodulation processing of a signal received via the main antenna, and transmits the processed signal to the control unit 17. In addition, the communication unit 15 executes modulation processing of a signal transmitted from the control unit 17, and transmits the signal to an external device (base station) via the main antenna.

The storage unit 16 includes, for example, working memory, and is utilized for arithmetic processing by the control unit 17. Furthermore, the storage unit 16 stores a single or plurality of applications or databases that are operated inside the mobile telephone device 1. It should be noted that the storage unit 16 may also serve as detachable external memory.

The control unit 17 controls the entire mobile telephone device 1 and controls the display unit 11, the detection unit 12, the microphone 13, the speaker 14, the communication unit 15, the storage unit 16, and the like. For example, when talking over a hands-free telephone call using the communication unit 15, the control unit 17 performs control such that the sensitivity of the microphone 13 is higher than that at the time of a normal telephone call and performs control such that the sound volume outputted from the speaker 14 is louder than that at the time of a normal telephone call.

In addition, when talking over a hands-free telephone call, video data of the user shot with the imaging unit 18 is sent to a device of the communication counterpart together with voice, and at the same time, video data of the communication counterpart is displayed on the display unit and the voice of the communication counterpart is outputted from the speaker based on the data sent from the device of the communication counterpart. Thus, the user can talk with the communication counterpart while looking at the face of the communication counterpart (so-called a video phone function). It should be noted that the mobile telephone device 1 of this embodiment is not limited to the normal voice telephone call described above but may be a voice call by packet telecommunication, a voice call by an application, or the like.

The storage unit 16 and the control unit 17 of this embodiment may be configured with a common computer. Such a common computer includes a central processing unit (CPU) as the control unit 17, a memory (RAM, ROM), a hard disk (HDD), or the like as the storage unit 16, for example. In such a common computer, the control unit 17 controls the overall mobile telephone device 1, and executes various programs by reading from the storage unit 16 as appropriate, thereby realizing various functions according to the invention by working together with the display unit 11, the detection unit 12, the microphone 13, the speaker 14, the communication unit 15, and the imaging unit 18 described above.

In addition, the control unit 17 includes a voice recognition conversion unit 171, an input control unit 172, an application control unit 173, and a morpheme extraction unit 174.

The voice recognition conversion unit 171 carries out voice recognition of contents of the talk held using the communication unit 15 and converts them to characters. Specifically, the voice recognition conversion unit 171 creates text information, which is made by making voice into text, by executing voice recognition processing on the signal of the call inputted from the communication unit 15.

The input control unit 172 inputs characters according to the contact operation, which is detected by the detection unit 12, to a software keyboard, such as one having QWERTY keys, which is displayed on the display unit 11. In addition, the input control unit 172 may input characters converted by the voice recognition conversion unit 171 in a hands-free telephone call. It should be noted that, although the description below describes a case where characters converted with the voice recognition conversion unit 171 are inputted in a hands-free telephone call, the present invention is not limited thereto, and the characters may be inputted using an operation unit such as one using a contact operation with regard to the display unit 11. Here, examples of the characters according to this embodiment include a number, an alphabetic character, a symbol, and a pictorial symbol ("emoji" in Japanese), in addition to a hiragana character, a katakana character, and a kanji character. In addition, the characters include a character string, which includes a plurality of characters, in addition to a single character.

Figure 3:
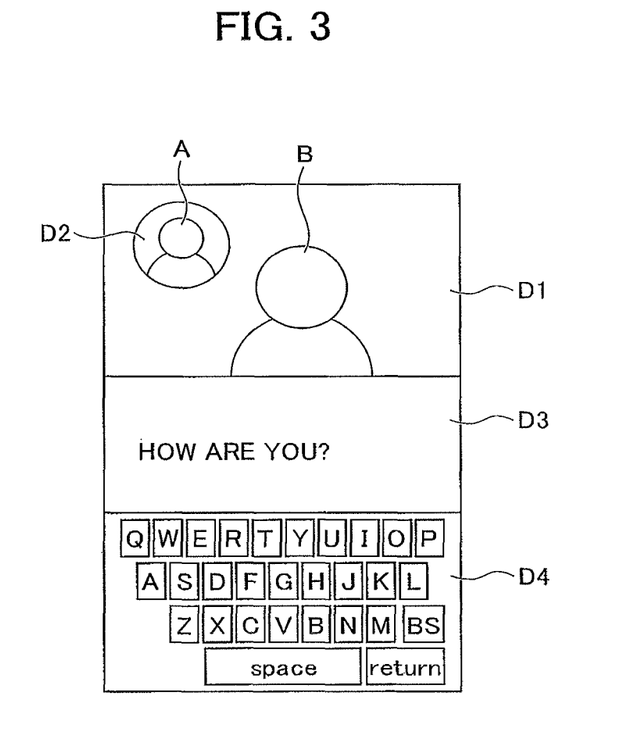
FIG. 3 is a first diagram showing a screen of a display unit at a time when a video phone function is executed.

FIG. 3 is a diagram showing a screen of the display unit 11 at a time when a video phone function has been executed by the mobile telephone device 1 of present embodiment. As shown in FIG. 3, the control unit 17 displays video data of the communication counterpart B in display region D1 of the display unit 11, and displays video data of the user A of the mobile telephone device 1 shot with the imaging unit 18 in display region D2.

In addition, the control unit 17 displays the input character in display region D3 of the display unit 11 based on the contact operation with respect to the display unit 11 detected by the voice recognition conversion unit 171 or the detection unit 12. Furthermore, the control unit 17 may display a software keyboard for inputting the character in display region D4 of the display unit 11.

The application control unit 173 inputs the character as an input character with the input control unit 172 in a state where a call is continuing with a designated counterpart by the communication unit 15. When a predetermined function is selected after the input character is inputted by the input control unit 172, the application control unit 173 executes a predetermined function in a state where the input character is inputted.

The morpheme extraction unit 174 extracts words by performing a morphological analysis of the characters converted by the voice recognition conversion unit 171. Specifically, the morpheme extraction unit 174 extracts a plurality of words by conducting a morphological analysis of the text information created by the voice recognition conversion unit 171.

Figure 4:
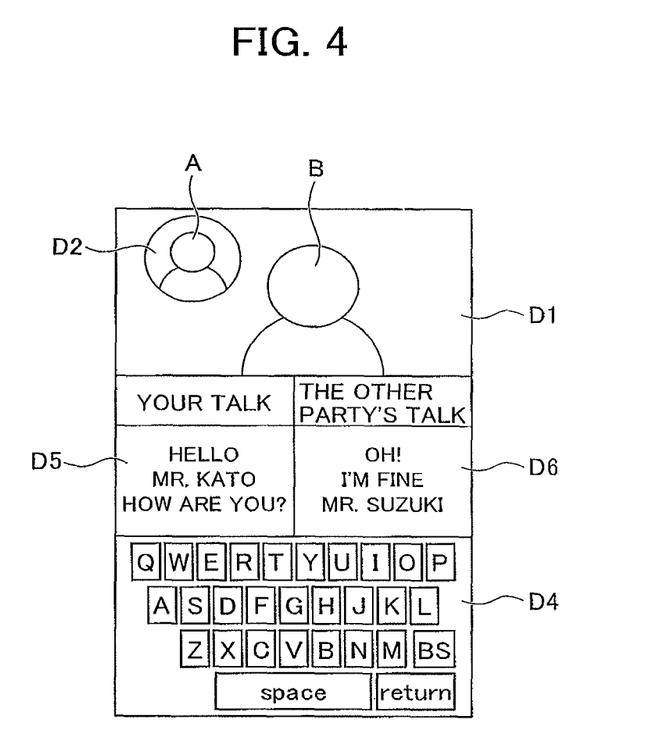
FIG. 4 is a second diagram showing the screen of the display unit at a time when a video phone function is executed.

FIG. 4 is a diagram showing the screen of the display unit 11 at a time when a video phone function has been executed with the mobile telephone device 1 of this embodiment. As shown in FIG. 4, the control unit 17 displays in display region D5 of the display unit 11 a plurality of words that are based on the contents of the talk of the user A and that are extracted by the morpheme extraction unit 174. In addition, the control unit 17 displays in display region D6 of the display unit 11 a plurality of words that are based on the contents of the talk in the communication counterpart, which have undergone a morphological analysis. Furthermore, a plurality of words displayed in display regions D5 and D6 are displayed, with a scroll capability where a newer word is placed in time series order.

The predetermined function described above may be a search function for searching predetermined data, for example. Specifically, examples of such a function include a function for searching the Internet, a function for searching data in data folders in the storage unit 16 using keywords, and an e-mail search function for searching e-mails in e-mail folders.

The application control unit 173 executes a search function in a state where the input character is inputted, so that a search is performed based on the input character. Moreover, the application control unit 173 controls the communication unit 15 such that the search result is sent to the terminal of the communication counterpart, which communicates using the communication unit 15.

Figure 5A:
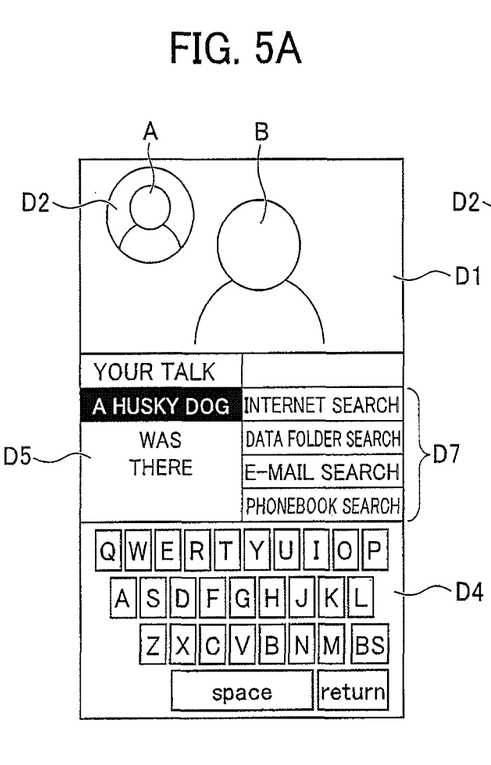
Figure 5B:
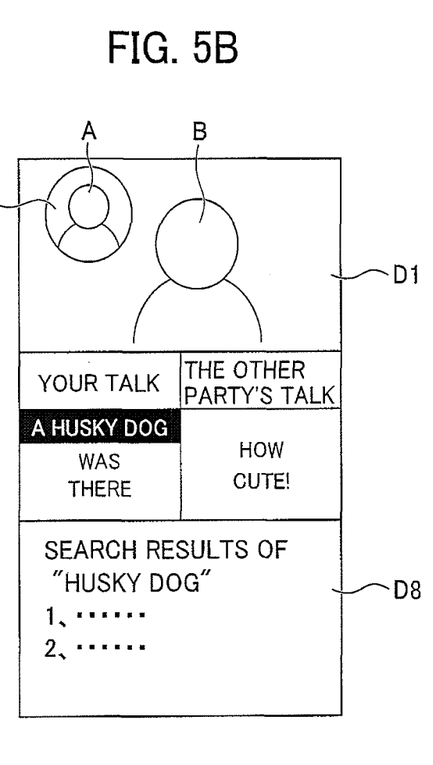
Figure 5C:
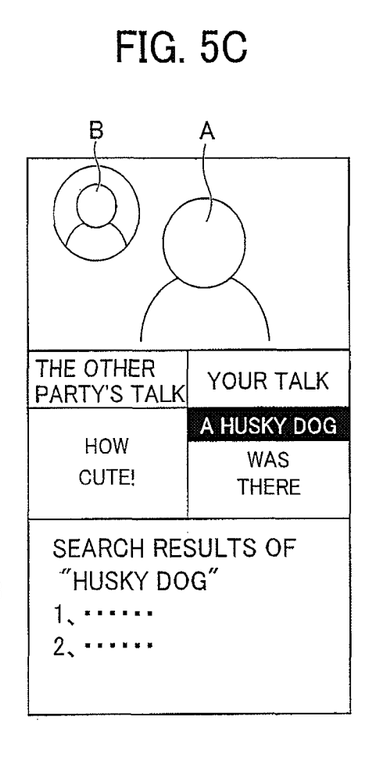

Specifically, as shown in FIG. 5(A), when a word "HUSKY DOG" in display region D5 is selected by, for example, a contact operation, the application control unit 173 displays in display region D7 an application that can perform a search based on the word in display region D5. Specifically, the application control unit 173 displays in display region D7 icons for executing a browser application, an application for searching data folders, and an e-mail application, and a phonebook application.

For example, when an icon of a browser application is selected by, for example, a contact operation, the application control unit 173 executes the browser application and performs an Internet search regarding the word "HUSKY DOG" with the browser application. Then, as shown in FIG. 5(B), the application control unit 173 displays the result of the Internet search in display region D8.

Furthermore, as shown in FIG. 5C, the application control unit 173 controls the communication unit 15 such that the search result is sent to the terminal of the communication counterpart, which communicates using the communication unit 15, and thus the result of the Internet search is displayed in the terminal of the communication counterpart.

Accordingly, since the mobile telephone device 1 can execute a predetermined function by using the character inputted during a telephone call, convenience is improved for the user during the telephone call.

In addition, the mobile telephone device 1 can execute a predetermined function during a telephone call using the character inputted by an operation using the operation unit, or the voice recognition conversion unit 171. Furthermore, since the mobile telephone device 1 extracts the character inputted using the voice recognition conversion unit 171 by performing a morphological analysis, it is possible to extract an input character that can be used for the predetermined function as appropriate.

In addition, since the mobile telephone device 1 sends the search result, which is based on the input character, to the terminal of the communication counterpart, the user can talk over the telephone with the communication counterpart while sharing the search result that is based on characters inputted by the communication counterpart and the user himself, and thus it is possible to improve convenience for the user during a telephone call.

In addition, the application control unit 173 may control the communication unit 15 such that the search result is converted into different data formats and sent to the terminal of the communication counterpart, according to the kind of data searched with the search application. Here, examples of the kind of data to be searched include e-mail data, image data, phonebook data, text data, and html data. In addition, examples of data formats into which data is converted include txt and html for e-mail data, JPEG, PNG, BMP or the like for image data, object for phonebook data, txt for text data, html for html data, and URLs.

In addition, if the application does not support a data format into which data is converted, the application control unit 173 may control the communication unit such that image data created by capturing a screen of an application (or a function) that has been executed in the mobile telephone device 1 (for example, JPEG, PNG, and BMP) is sent to the terminal of the communication counterpart.

Accordingly, since the mobile telephone device 1 sends the search result to a predetermined counterpart by converting it into different formats, the search result can be advantageously displayed at the terminal of the communication counterpart.

In addition, the control unit 17 may include a coordination unit 175 for displaying the same display as the display displayed on the display unit 11 in coordination with a display unit in the terminal of the communication counterpart communicating using the communication unit 15.

In a state where a call is continuing with the predetermined communication counterpart using the communication unit 15, the application control unit 173 selects a predetermined application after a character is inputted. Moreover, when a display that is based on the selection of the predetermined application is displayed on the display unit 11, the application control unit 173 controls the coordination unit 175 such that the display based on the selection of the predetermined function is displayed on a display unit of the terminal of the communication counterpart.

Figure 6A:
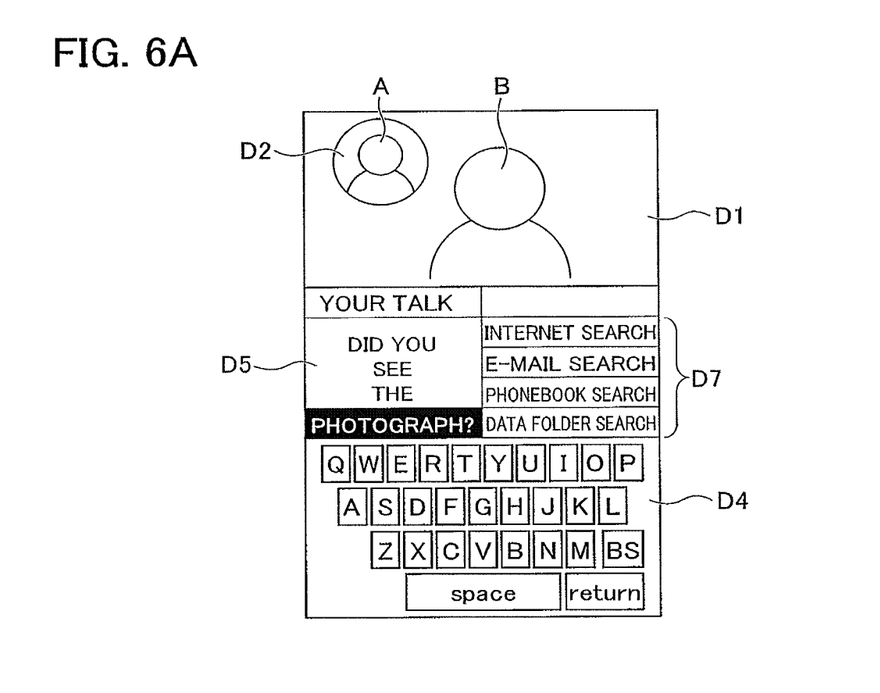
Figure 6B:
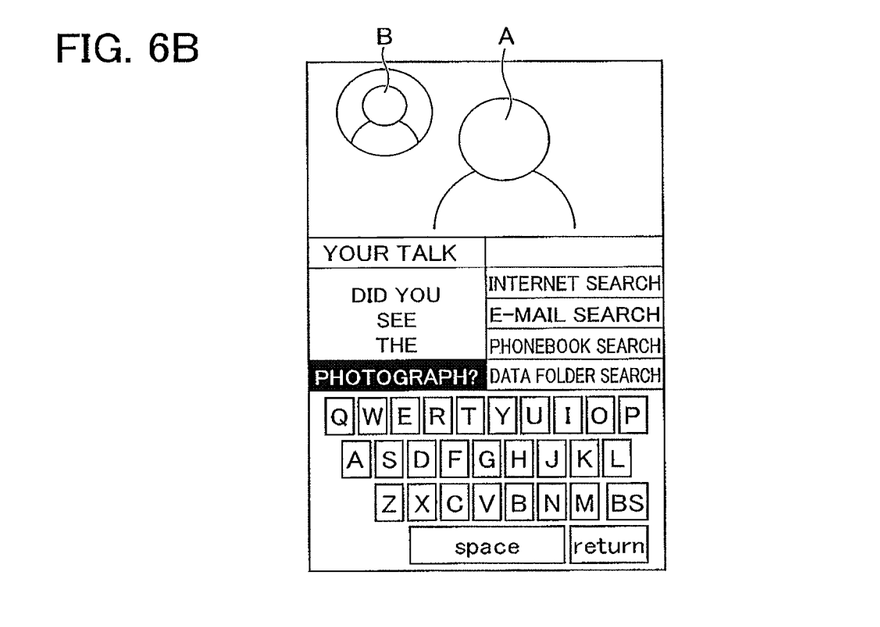

Specifically, as shown in FIG. 6A, the application control unit 173 makes a word "PHOTOGRAPH" selected in display region D5, and displays icons for executing functions for searching the word "PHOTOGRAPH" in display region D7 (Internet search function e-mail search function, data folder search function, and phonebook search function).

In addition, the coordination unit 175 sends data related to the plurality of words displayed in display region D5 and icons displayed in display region D7 to the terminal of the communication counterpart. Moreover, as shown in FIG. 6B, the terminal of the communication counterpart displays the same display as the display displayed in display regions D5 and D7 on the display unit based on the data related to the plurality of words displayed in display regions D5 and icons displayed in display region D7, which are sent from the mobile telephone device 1. It should be noted that, in order to perform such control, the mobile telephone device 1 and the terminal of the communication counterpart have a common application, and an application for displaying a display displayed on one of the terminals on the other terminal.

Accordingly, the user of the mobile telephone device 1 can display the display based on the selection of the predetermined function in the terminal of the predetermined communication counterpart as well, and can talk over the phone with the communication counterpart while sharing the display that is based on the selection of the predetermined function with the communication counterpart. Therefore, the mobile telephone device 1 can further improve convenience for the user at the time of a telephone call.

Figure 7:
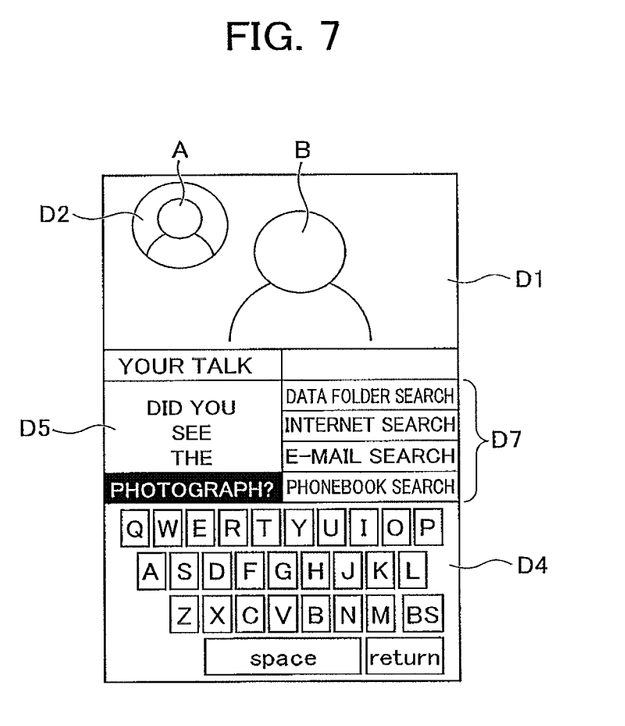
FIG. 7 is a fifth diagram showing the screen of the display unit at the time when a video phone function has been executed.

Here, the predetermined function may be a function selected from a plurality of character inputting functions that can perform processing based on the input character. Moreover, the application control unit 173 changes the function included as a plurality of character inputting functions and the priority order of the display, according to the communication counterpart (terminal of the communication counterpart) communicating using the communication unit 15. As shown in FIG. 7, priority is given to the display of the data folder search over the display of the Internet search, in the icons displayed in display region D7.

Specifically, the application control unit 173 determines the priority order of the plurality of character inputting functions based on the history record of the voice call, and changes the display order of the plurality of character inputting functions according to the determined priority order. For example, when attributes of the communication counterpart are included in voice call data of the video phone function (for example, profile data), the application control unit 173 counts the number of times of coordination with the communication counterpart using the character inputting function, and sets a higher priority order for a character inputting function that has a large count. In addition, the application control unit 173 may change the display order of the plurality of character inputting functions for every word in display region D5 by storing into the storage unit 16 a table where a word and a character inputting function are associated with each other in advance. Furthermore, the application control unit 173 may change the display order of a plurality of character inputting functions based on both the history record of the voice call and each word in display region D5.

Accordingly, since the mobile telephone device 1 changes the function included in the plurality of character inputting functions according to the communication counterpart, it is possible to display appropriate functions in the terminal of the communication counterpart and improve user convenience for the communication counterpart.

Figure 8:
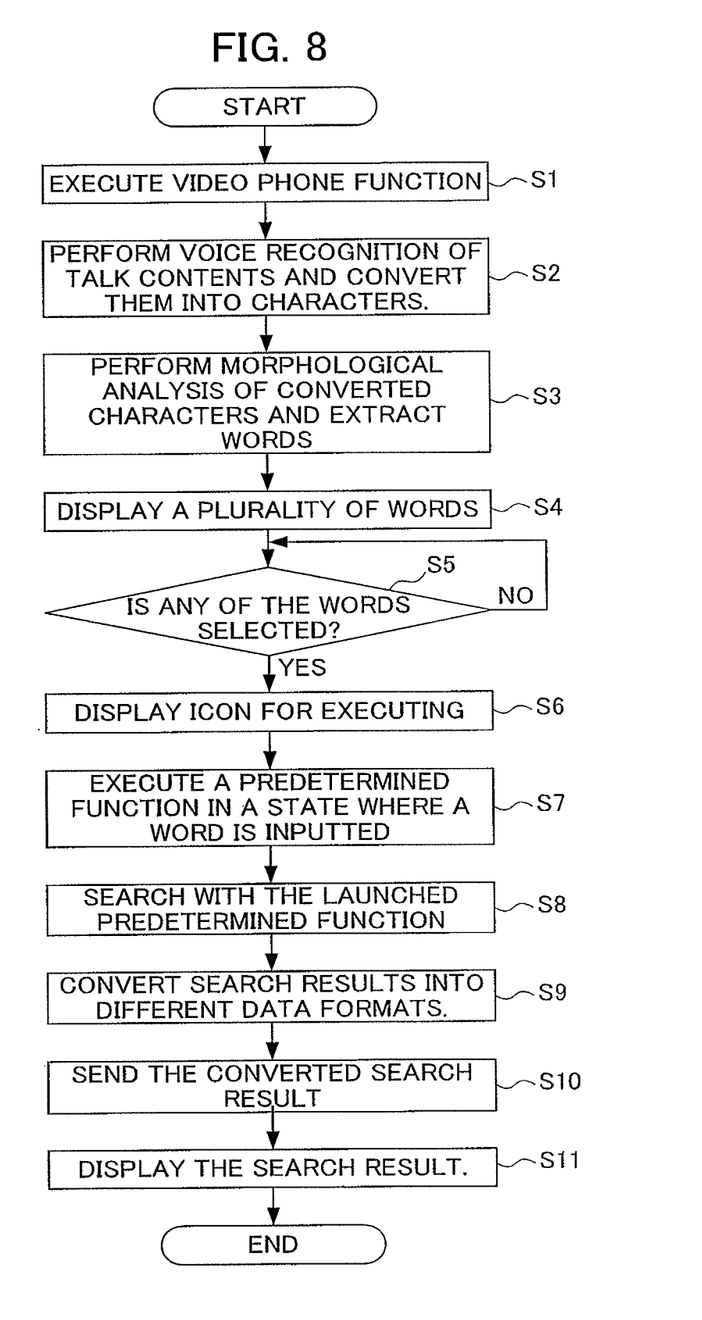
FIG. 8 is a flow chart showing processing of the control unit according to the embodiment.

FIG. 8 is a flow chart showing processing of the control unit 17 according to this embodiment. In Step S1, the control unit 17 executes the video phone function and talk using a video call with the terminal of the communication counterpart.

In Step S2, the voice recognition conversion unit 171 carries out voice recognition of the contents of the talk and converts them into characters.

In Step S3, the morpheme extraction unit 174 extracts words by performing a morphological analysis of the characters converted by the voice recognition conversion unit 171.

In Step S4, the application control unit 173 displays on the display unit 11 a plurality of words extracted by the morpheme extraction unit 174 and a plurality of words based on the contents of the talk with the communication counterpart, which have undergone morphological analysis.

In Step S5, the application control unit 173 determines whether or not any of the plurality of words is selected. If any of the plurality of words is selected (YES), the process proceeds to Step S6. If none of the plurality of words is selected (NO), the processing in Step S5 is repeated.

In Step S6, the application control unit 173 displays on the display unit 11, icons or the like for executing a predetermined function, which includes a search function for searching the predetermined data and a function selected among a plurality of character inputting functions. In addition, when a priority order is set for the predetermined functions, the application control unit 173 displays icons or the like on the display unit 11 based on the priority order.

In Step S7, the application control unit 173 executes a predetermined function in a state where the selected word is inputted as the input character.

In Step S8, the application control unit 173 performs the search based on the input character in accordance with the executed predetermined function. 7

In Step S9, the application control unit 173 converts the search result into different data formats according to the kind of data searched.

In Step S10, the application control unit 173 sends the converted search result to the terminal of the communication counterpart.

In Step S11, the application control unit 173 displays the search result on the display unit 11.

Although the embodiment of the present invention has been described above, the present invention is not limited to the aforementioned embodiment, and can be altered as appropriate.

Moreover, although the mobile telephone device 1 as a portable electronic device has been described in the aforementioned embodiment, the mobile telephone device 1 can be applied to other electronic devices. For example, the portable electronic device of the present invention may be a digital camera, a PHS (Personal Handyphone System), a PDA (Personal Digital Assistant), a portable navigation device, a personal computer, a notebook PC, a mobile gaming device or the like.

In addition, although the mobile telephone device is of the straight type in the first to third embodiments, the mobile telephone device is not limited thereto. For example, the mobile telephone device may be of; a slider type in which one of bodies slides to one direction in a state in which both bodies are mutually superimposed; or a rotating (turning) type in which one of the bodies is rotated around an axis line along the direction of superimposing the bodies. In addition, although the mobile telephone device including the touch panel is not limited to the aforementioned embodiment, for example, the mobile telephone device may have physical operation keys as the input unit (operation unit), and may be operable by operating the physical operation keys.

What is claimed is:

1. An electronic device, comprising:
    a communication unit;
    an input unit for inputting a character; and
        a control unit which, when triggered by (i) selection of an input character input by the input unit and (ii) selection of a predetermined function selected at a time when a call is being made with a predetermined communication counterpart by the communication unit, executes the predetermined function using the input character itself, the input character being selected from communication information transmitted between the communication unit and the predetermined communication counterpart,
    wherein the control unit determines a priority order of a plurality of character inputting functions based on a history record of the call, and changes a display order of the plurality of character inputting functions according to the determined priority order.

2. The electronic device according to claim 1, wherein
    the predetermined function is a search function for searching predetermined data, and
    the control unit performs a search based on the input character by executing the search function in a state where the character is inputted, and sends a search result to the predetermined communication counterpart by the communication unit.

3. The electronic device according to claim 2, wherein the control unit controls the communication unit such that the search result is converted into different formats and sent to the predetermined communication counterpart according to the kind of data searched by the search function.

4. The electronic device according to claim 1, further comprising an operation unit, wherein the input unit inputs a character as an input character according to an operation of the operation unit.

5. The electronic device according to claim 1, further comprising a voice recognition conversion unit for converting contents of talk carried out using the communication unit into characters by performing voice recognition,
    wherein the input unit inputs the character converted by the voice recognition conversion unit as an input character.

6. The electronic device according to claim 5, further comprising an extraction unit for extracting a word by performing a morphological analysis of the character converted by the voice recognition conversion unit,
    wherein the input unit inputs, as an input character, the word extracted by the extraction unit, among the characters converted by the voice recognition conversion unit.

7. The electronic device according to claim 1, further comprising a display unit,
    wherein, when the input character is inputted and the predetermined function is selected such that contents that are based on the selection of the predetermined function are displayed on the display unit at a time when a call is being made with a predetermined communication counterpart by the communication unit, the control unit displays the contents on the display unit included in an electronic device of the predetermined communication counterpart.

8. The electronic device according to claim 1, wherein
    the predetermined function is a function selected from the plurality of character inputting functions configured to perform processing based on the input character, and
    the control unit changes a function included in the plurality of character inputting functions according to the communication counterpart that the communication unit communicates with.

9. The electronic device according to claim 1, wherein
    the predetermined function is a function selected from the plurality of character inputting functions configured to perform processing based on the input character, and
    the control unit changes a part of or all of the plurality of character inputting functions according to the communication counterpart that the communication unit communicates with.

10. A method of controlling an electronic device having an input unit, a communication unit, and a control unit, the method comprising:
    communicating;
    inputting a character;
    executing a function; and
    executing, when triggered by (i) selection of an input character input as a result of the inputting and (ii) selection of a predetermined function selected at a time when a call is being made with a predetermined communication counterpart as a result of the communicating, a predetermined function using the input character itself, by the input unit, the input character being selected from communication information transmitted between the communication unit and the predetermined communication counterpart,
    wherein the control unit determines a priority order of a plurality of character inputting functions based on a history record of the call, and changes a display order of the plurality of character inputting functions according to the determined priority order.

11. A non-transitory storage medium that stores a control program causing, when executed by an electronic device having an input unit, a communication unit, and a control unit, the electronic device to perform operations comprising:
    communicating;
    inputting a character; and
    executing, when triggered by (i) selection of an input character input as a result of the inputting and (ii) selection of a predetermined function selected at a time when a call is being made with a predetermined communication counterpart as a result of the communicating, a predetermined function by the input unit using the input character itself, the input character being selected from communication information transmitted between the communication unit and the predetermined communication counterpart,
    wherein the control unit determines a priority order of a plurality of character inputting functions based on a history record of the call, and changes a display order of the plurality of character inputting functions according to the determined priority order.

* * * * *